(12) United States Patent
Hayashi

(10) Patent No.: US 8,726,484 B2
(45) Date of Patent: May 20, 2014

(54) WATERPROOFING DEVICE FOR MOBILE APPARATUS AND METHOD OF MANUFACTURING THE SAME

(75) Inventor: Takahiro Hayashi, Fujisawa (JP)

(73) Assignee: Nippon Mektron, Ltd. (JP)

( * ) Notice: Subject to any disclaimer, the term of this patent is extended or adjusted under 35 U.S.C. 154(b) by 279 days.

(21) Appl. No.: 12/993,583

(22) PCT Filed: Jul. 1, 2009

(86) PCT No.: PCT/JP2009/062059
§ 371 (c)(1),
(2), (4) Date: Nov. 19, 2010

(87) PCT Pub. No.: WO2010/026827
PCT Pub. Date: Mar. 11, 2010

(65) Prior Publication Data
US 2011/0069913 A1 Mar. 24, 2011

(30) Foreign Application Priority Data

Sep. 2, 2008 (JP) ................................. 2008-224396
May 28, 2009 (JP) ................................. 2009-128623

(51) Int. Cl.
*B23P 11/02* (2006.01)
*B23P 17/06* (2006.01)

(52) U.S. Cl.
USPC .......................................... 29/527.1; 29/451

(58) Field of Classification Search
USPC ............ 29/888.3, 451, 527.1, 527.2; 264/259
See application file for complete search history.

(56) References Cited

U.S. PATENT DOCUMENTS 5,432,676 A 7/1995 Satoh et al.
7,142,898 B2 * 11/2006 Takagi ........................ 455/575.3
7,251,512 B2 * 7/2007 Komiyama ................ 455/575.3
2005/0225952 A1 10/2005 Takagi
2009/0255528 A1 * 10/2009 Weise et al. .................... 126/623

FOREIGN PATENT DOCUMENTS

| JP | 5-259656 A | 10/1993 | |
|---|---|---|---|
| JP | 2003-142836 A | 5/2003 | |
| JP | 2004-121541 A | 4/2004 | |
| JP | 2004-214927 A | 7/2004 | |
| JP | 2005-282776 A | 10/2005 | |
| JP | 2005-325849 A | 11/2005 | |
| JP | 2005325849 A | * 11/2005 | .............. F16C 11/04 |

OTHER PUBLICATIONS

JPO machine translation of JP 2005-325849 A.*
Machine Translation of Kawasaki (JP 2005-325849 A).*

* cited by examiner

*Primary Examiner* — Alexander P Taousakis
*Assistant Examiner* — Matthew P Travers
(74) *Attorney, Agent, or Firm* — Harness, Dickey & Pierce, P.L.C.

(57) ABSTRACT

A waterproofing device is provided for a mobile apparatus, using a thin coaxial cable or an optical cable and capable of being applied to a portable telephone of a bi-directionally openable/closable type. The waterproofing device is adapted to connect housings to each other by a linear member. The waterproofing device is provided with seal members consisting of a rubber-like elastic material and sealing a gap between the housings, and also with a connecting member having opposite ends in the vicinities of which the seal members are integrated. The linear member is passed through the inside of the connecting member to electrically interconnect electronic parts of the housings. The connecting member has a circular tube-like shape consisting of a soft resin material.

12 Claims, 4 Drawing Sheets

WATERPROOFING DEVICE FOR MOBILE APPARATUS AND METHOD OF MANUFACTURING THE SAME

CROSS-REFERENCE TO RELATED APPLICATIONS

This is a national stage of the International Application No. PCT/JP2009/062059 filed Jul. 1, 2009 and published in the Japanese language. This application claims the benefit of Japanese Patent Application No. 2008-224396 filed on Sep. 2, 2008 and Japanese Patent Application No. 2009-128623 filed on May 28, 2009. The disclosures of the above applications are incorporated herein by reference.

BACKGROUND OF THE INVENTION

1. Field of the Invention

The present invention relates to a waterproofing device for a mobile apparatus.

Further, the present invention relates to a waterproofing device for a mobile apparatus providing waterproofing structures for an electronic apparatus and a connector.

More specifically, the present invention relates to a waterproofing device for a mobile apparatus using a thin coaxial cable or an optical cable and is applicable to a portable telephone of a bi-directionally openable/closable type which can be opened in a lengthwise direction and a widthwise direction.

2. Description of the Conventional Art

In recent years, a waterproofing connector used for electronic apparatuses such as a portable telephone, a wire harness for an automobile, or the like has been miniaturized, and simultaneously, the waterproofing connector has been required to have a high water proofing function.

For making an electronic apparatus including a plurality of spaces to have the waterproofing function, it is necessary to make a housing configuring each space to have air-tightness and to electrically connect respective spaces by a linear member such as a wire harness and a flexible substrate, or the like.

In this case, a method of providing terminals on wall surfaces of the housings partitioning each space and connecting the terminals by a wiring material, and a method of passing the wiring material through the wall surface of the housing and filling a space formed between the wiring material and the housing with an adhesive have been proposed.

However, the embodiment to provide terminals on the housing wall surface has a problem that the device becomes large.

The method of filling the space formed between the wiring material and the housing with an adhesive causes a problem that disassembling and re-assembling are difficult.

Thus, an embodiment of integrally molding a seal member with a flexible wiring substrate as illustrated in FIGS. 5 and 6 has been proposed (Japanese Patent Application Laid-Open No. 2003-142836 and Japanese Patent Application Laid-Open No. 2004-214927).

In the embodiment illustrated in FIG. 5, a seal member 301 having a frame shape matching each housing shape (not illustrated) is integrally molded with a flexible wiring substrate 100.

The flexible wiring substrate 100 penetrates each seal member 301, and electronic parts are mounted on the flexible wiring substrate 100 within an area surrounded by each seal member 301.

Further, in the embodiment illustrated in FIG. 6, a bush-shaped seal member 303 is integrally molded with a flexible wiring substrate 100.

The seal member 303 is mounted to an insertion hole provided at each housing (not illustrated).

Further, connectors 304 provided at both ends of the flexible wiring substrate 100 are electrically connected with electric parts in the housings.

However, in these methods for integrally molding the seal member 301 or 303 to the flexible wiring substrate 100, there is a danger that the flexible wiring substrate 100 is damaged by a clamping pressure or a high temperature at a time of molding.

As such, an embodiment of integrally molding a connecting part (a hinge part) consisting of a soft resin material and a housing consisting of a hard resin material, and then inserting a flexible wiring substrate into an insertion hole provided at the connecting part, has been proposed (Japanese Patent Application Laid-Open No. H5-259656).

However, since a metal mold for molding is complicated and large, the molding cost becomes high. In addition to this, it is very hard to perform an operation for inserting the flexible wiring substrate into the insertion hole in the housing, which is a closed space.

Further, recently, in small communication devices including a portable telephone, various differentiations have been carried out according to the expansion of a user layer, so that various production developments have been carried out in fields of miniaturization, impact resistance, waterproofing, and the like.

According to these requirements, for exercising various kinds of functions, it becomes necessary to increase the number of wiring lines and to realize multiaxial movement (a bi-directionally openable/closable type).

Therefore, in the embodiment of using the conventional flexible wiring substrate, there occurs a problem that these requirements cannot be fulfilled.

As such, a thin coaxial cable and an optical cable have been discussed as a wiring capable of multiaxial movement.

However, as for the thin coaxial cable, it is very difficult to uniformly spread a gasket material in gaps between numbers of very thin cables which are bundled. Further, it is also very difficult to adhere a conventional gasket to the thin coaxial cable since the thin coaxial cable is low in adhesiveness with a fluororesin layer used as a covering material for the cable.

Further, since there are many pinholes in a covering material of such a cable, invasion of water into the thin coaxial cable cannot be prevented, so that there is a problem that the device in the housing is corroded.

Particularly, in the case of a portable telephone of a bi-directionally openable/closable type using the thin coaxial cable or the optical cable, a torsional motion is applied to a connecting part in addition to a conventional swing motion of a prescribed angle. Thus, there is a problem that a conventional flat plate shape or materials such as a rubber like elastic material cannot endure these motions.

SUMMARY OF THE INVENTION

Problems to be Solved by the Invention

The present invention attempts to solve the above-mentioned problems, and an objective is to provide a waterproofing device for a mobile apparatus, using a thin coaxial cable or an optical cable and being applicable to a portable telephone of a bi-directionally openable/closable type.

Means for Solving the Problem

According to an aspect of the present invention to realize the above-described objective, a waterproofing device for a mobile apparatus, which is adapted to connect housings to each other by a linear member, is provided with seal members consisting of a rubber-like elastic material for sealing a gap between the housings, and also with a connecting member having opposite ends in the vicinities of which the seal members are integrated. The linear member is passed through the inside of the connecting member to electrically interconnect electronic parts in the housings. The connecting member is molded in a circular tube-like shape with a soft resin material.

Effect of the Invention

The present invention has the effects described below.

According to the waterproofing device for a mobile apparatus of the present invention according to a first aspect, the seal members consisting of a rubber-like elastic material and the soft resin material are used in combination, where the seal members are proper for statically sealing the gap between the housings, and the soft resin material is proper as a material for a connecting the member to which a torsional motion is applied in addition to a swing motion. Therefore, waterproofing of a thin mobile apparatus of a bi-directionally openable/closable type to which the torsional motion is applied in addition to the swing motion can be secured stably for a long period of time.

Further, according to a waterproofing device for a mobile apparatus according to a second aspect, waterproofing performance can increase, while keeping the flexibility of the thin coaxial cable or the optical cable.

Further, according to a waterproofing device for a mobile apparatus according to a third aspect, an operation resistance at a time of opening/closing a mobile apparatus is low, and specifically, the waterproofing device can be applied to a thin mobile apparatus. In addition, a waterproofing performance can increase, while keeping flexibility of the thin coaxial cable or the optical cable.

Furthermore, according to a waterproofing device for a mobile apparatus according to a fourth aspect, a shape of a connecting member is not deformed at portions integrated with seal members, which tend to deform easiest. Thus, no damage occurs to a linear member.

Further, according to a waterproofing device for a mobile apparatus according to a fifth aspect, the deformation of the connecting member can be more accurately prevented.

Further, according to a waterproofing device for a mobile apparatus according to a sixth aspect, the seal members and the connecting member can be accurately integrated.

Further, according to a waterproofing device for a mobile apparatus according to a seventh aspect, invasion of water from a gap between seal members and the connecting member can be accurately prevented.

Further, according to a waterproofing device for a mobile apparatus according to an eighth aspect, thermal and physical effects to a connecting member at a time of molding seal members can be suppressed.

Further, according to a waterproofing device for a mobile apparatus according to a ninth aspect, the waterproofing device can be adapted to various kinds of mobile apparatuses.

Further, according to a waterproofing device for a mobile apparatus according to a tenth aspect, since no other member for sealing a gap between the housings needs to be used, the number of parts decreases and the reliability of a water proofing function can increase.

Further, according to a waterproofing device for a mobile apparatus according to an eleventh aspect, the waterproofing device can be properly used for a mobile apparatus of a bi-directionally openable/closable type using a thin coaxial cable or an optical cable.

Further, according to a waterproofing device for a mobile apparatus according to a twelfth aspect, the waterproofing device can be properly used for various kinds of mobile apparatuses.

Further, according to a waterproofing device for a mobile apparatus according to a thirteenth aspect, the waterproofing device can be properly used for various kinds of mobile apparatuses.

Further, according to a method of manufacturing the waterproofing device for a mobile apparatus according to a fourteenth aspect, since the waterproofing device includes reinforcement members, the seal members and the connecting member can be integrated correctly and accurately.

Further, according to a second aspect of a method of manufacturing the waterproofing device for a mobile apparatus according to a fifteenth aspect, since the waterproofing device includes reinforcement members, the seal members can be mounted to the connecting member, having a sufficient fastening margin, so that the connecting member and the seal members can be accurately integrated.

DETAILED DESCRIPTION OF PREFERRED EMBODIMENT

The preferred embodiments for carrying out the present invention will be described below.

The preferred embodiments for carrying out the present invention will be described with reference to FIGS. 1 to 4.

Example 1

The waterproofing device for a mobile apparatus according to the present invention includes a basic configuration adapted to connect housings (not illustrated) to each other by a linear member.

Figure 1:
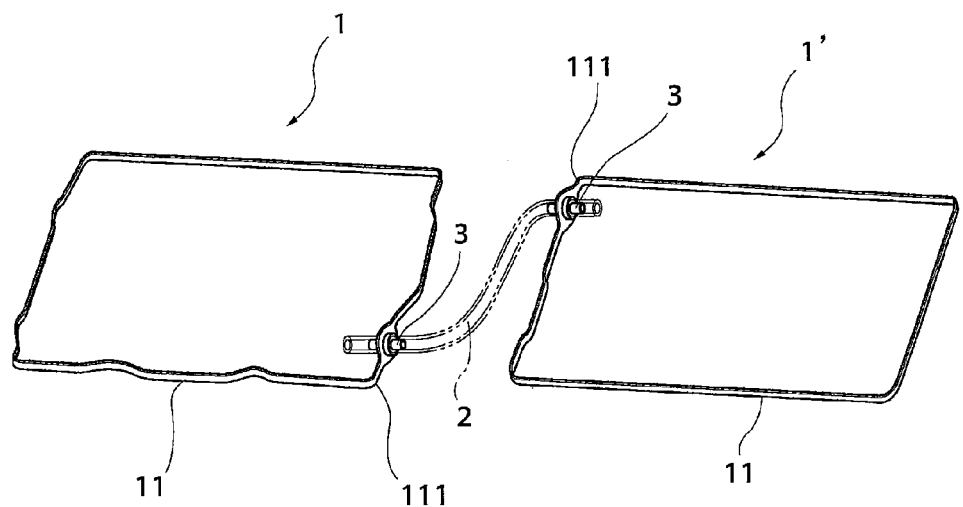
FIG. 1 is a plan view illustrating a shape of a sealing structure body used for a waterproofing device for a mobile apparatus according to the present invention.
Figure 2:
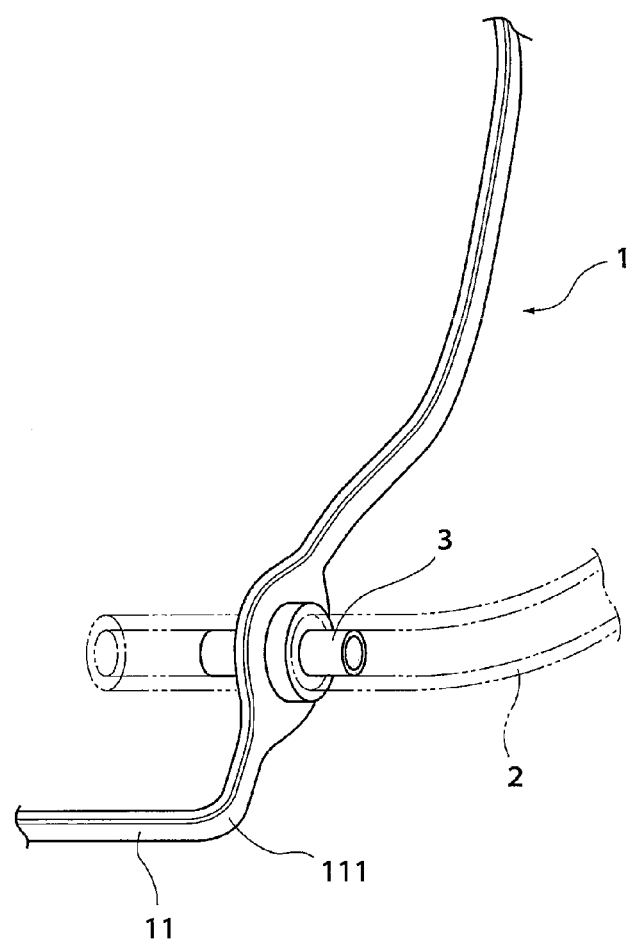
FIG. 2 is a partial expanded view in FIG. 1.

A form of a seal structure body used in the present invention is a waterproofing device for a mobile apparatus, adapted to connect housings to each other by a linear member as illustrated in FIGS. 1 and 2. The waterproofing device is provided with seal members 1 and 1' consisting of a rubber-like elastic material and sealing a gap between the housings, and also with a connecting member 2 having opposite ends in the vicinities of which the seal members 1 and 1' are integrated. The linear member is passed through the inside of the connecting member 2 to electrically interconnect electronic parts in the housings.

Further, the connecting member 2 is molded in a circular tube-like shape with a soft resin material.

As the soft resin material, resin materials such as a soft silicon resin, a soft polyester resin, a soft polyurethane resin, and the like, can be used. However, the soft silicon resin is especially proper because of its characteristics such as flexibility and the like.

Furthermore, a shape of the connecting member 2 is the tube-like shape having an outer diameter of 1 to 3 mm and a thickness of 0.1 to 0.3 mm.

Therefore, the waterproofing device has low resistance at a time of opening/closing a mobile apparatus, and particularly, can be applied to a thin mobile apparatus.

Further, as the linear member, a thin coaxial cable or an optical cable is used.

Thus, the waterproofing device for a mobile apparatus can be adapted to various kinds of functions.

Further, cylindrical reinforcement members 3 consisting of a hard material are arranged in portions at the inner peripheral surface side of the connecting member 2 where the seal members 1 and 1' are arranged.

As a material for the reinforcement member 3, metal materials such as stainless steel, aluminum, and the like, hard resins, or the like is used. However, stainless steel is proper in view of corrosion resistance and mechanical strength.

When the waterproofing device includes the reinforcement members 3, a shape of a connecting member is not deformed at portions which are integrated with seal members and tend to be deformed easiest. Thus, no damage is given to the linear member.

Further, as the material for the seal members 1 and 1', various kinds of rubber-like elastic materials such as silicon rubber, nitrile rubber, fluororubber, and the like can be used. However, a rubber-like elastic material having selective adhesiveness is desirable. More specifically, the rubber-like elastic materials having the selective adhesiveness with respect to the connecting member 2, e.g., a self-adhesive type silicon rubber, TPE, and the like, are preferably used.

The seal members 1 and 1' can be integrally molded on an outer peripheral surface of the connecting member 2, or can be fitted and fixed on the outer peripheral surface of the connecting member 2 after molding the seal members 1 and 1'.

The seal members 1 and 1' are frame-shaped seals 11 and 11.

Further, the connecting member 2 is integrated in the vicinities of corner parts 111 of the frame-shaped seals 11.

By taking this configuration, the waterproofing device can be applied to a mobile apparatus of a bi-directionally openable/closable type, using a thin coaxial cable or an optical cable.

The reason is that a torsional motion can be generated in addition to a swing motion at the connecting member 2, when the waterproofing device is used.

Next, a form of another seal structure body used for the waterproofing device for a mobile apparatus according to the present invention will be described with reference to FIGS. 3 and 4.

Figure 3:
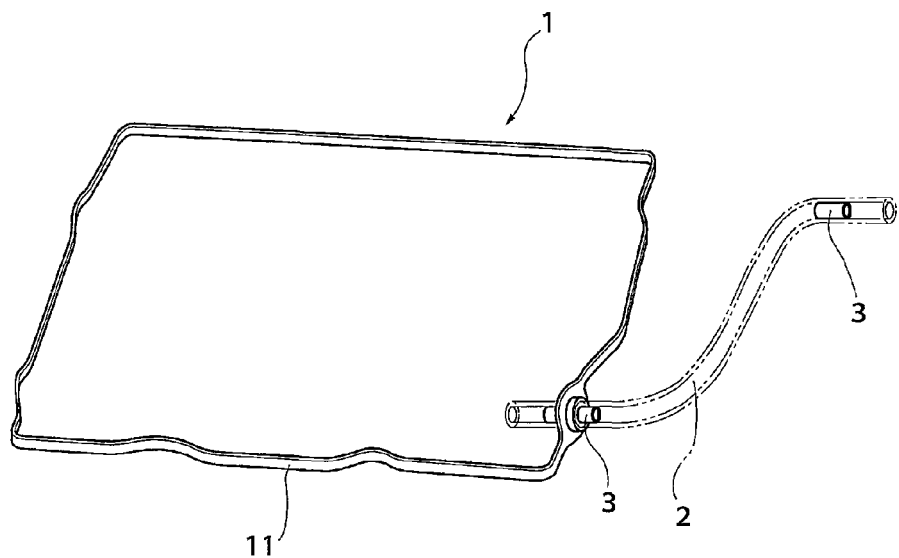
FIG. 3 is a plan view illustrating a shape of another sealing structure body which is in a semi-finished state and used as a waterproofing device for a mobile apparatus according to the present invention.

In FIG. 3, the frame-shaped seal 11 is integrally molded on only one side of the connecting member 2.

Further, similarly to the above-described embodiment, a cylindrical reinforcement member 3 consisting of stainless steel is arranged in a portion at the inner peripheral surface side of the connecting member 2 where the seal member 1 is arranged.

Further, a cylindrical reinforcement member 3 consisting of stainless steel is inserted into a portion at the other side of the connecting member 2 where a bush-shaped seal 12 is to be arranged.

Figure 4:
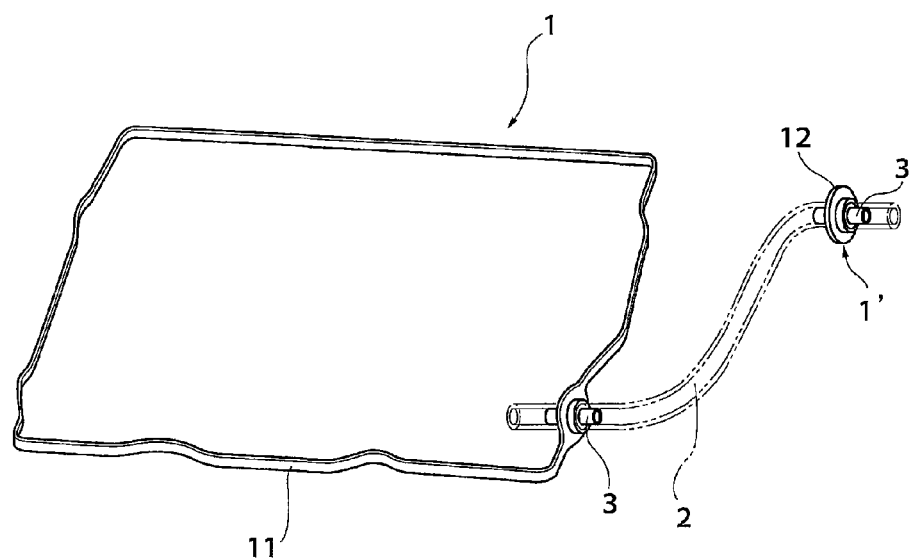
FIG. 4 is a plan view illustrating a shape of another sealing structure body finished by fitting and fixing a bush-shaped seal to the semi-finished product of FIG. 3.
Figure 5:
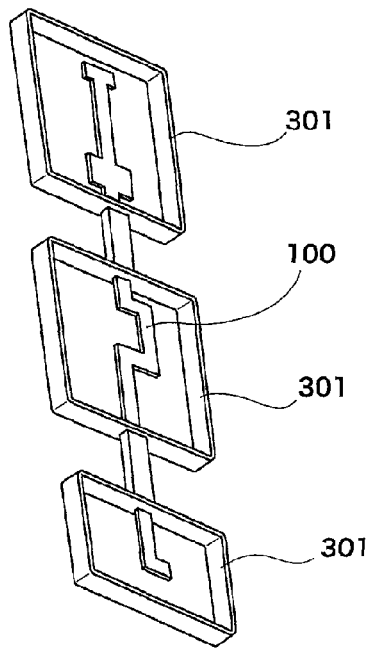
FIG. 5 is a plan view illustrating a sealing structure body according to a conventional exemplary embodiment.
Figure 6:
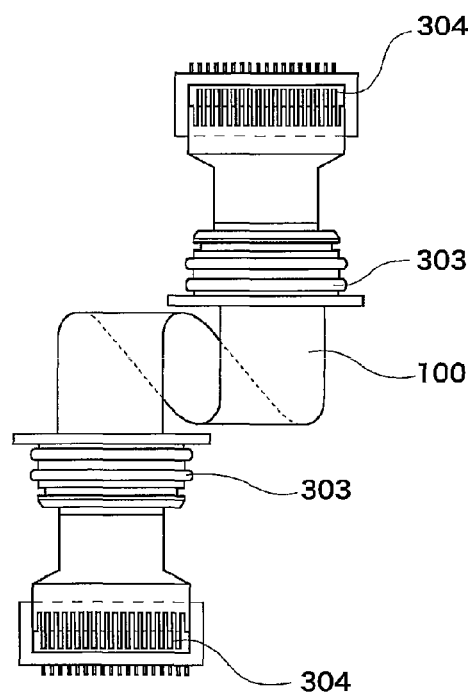
FIG. 6 is a plan view illustrating a sealing structure body according to another conventional exemplary embodiment.

Then, a bush-shaped seal 12 produced by another production step is fitted and fixed on the other side of the connecting member 2, as illustrated in FIG. 4.

Since an inner diameter of the bush-shaped seal 12 has a size which is slightly smaller than an outer diameter of the connecting member 2, a gap is not formed between the bush-shaped seal 12 and the connecting member 2.

The waterproofing device can have the above-described configuration due to the inclusion of the reinforcement member 3.

Accordingly, the seal members 1 and 1' can be the frame-shaped seals 11, the bush-shaped seals 12, or a combination of them.

Furthermore, the seal members 1 and 1' can be molded integrally with the connecting member 2, or can be fitted and fixed with the connecting member 2.

Next, a manufacturing method of the present invention will be described.

Manufacturing Method 1

Figure 7:
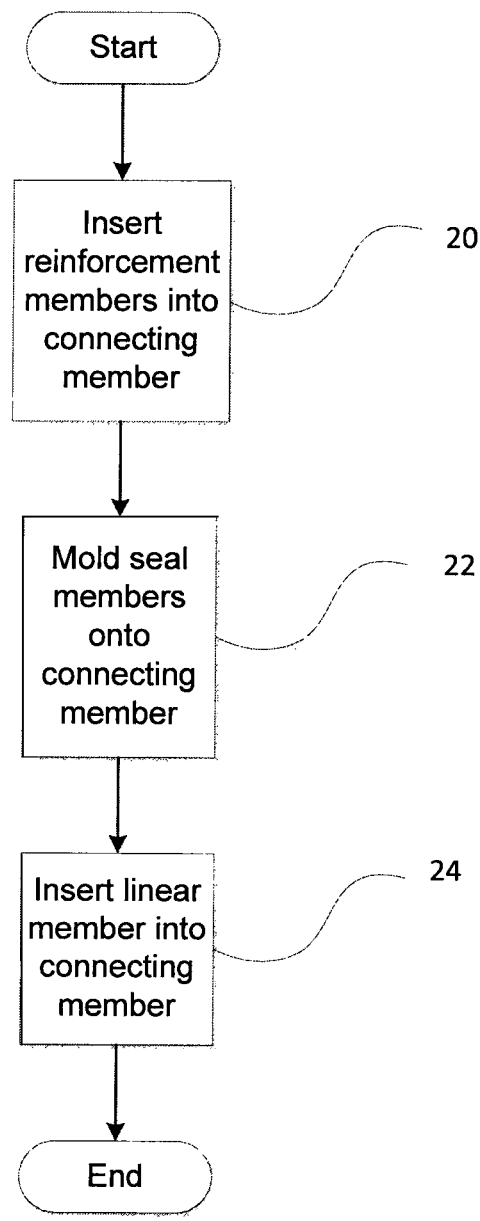
FIG. 7 is a flow chart illustrating a method of manufacturing a waterproofing device for a mobile apparatus.

As illustrated in FIG. 7, at step 20, the cylindrical reinforcement member 3 consisting of a stainless steel are inserted into the inner peripheral surface side in the vicinities of end parts of the connecting member 2 molded in a circular tube-like shape with a soft silicon resin and having an outer diameter of 2 mm and a thickness of 0.2 mm.

The outer diameter of the cylindrical reinforcement member 3 is an approximately equal size to the inner diameter of the connecting member 2. Further, it is sufficient for the reinforcement members 3 to have a length so as to correspond to a region to which a metal mold contacts at a time of molding the seal members 1 and 1'.

Then, at step 22, using the metal mold, the seal member 1 consisting of a silicon rubber material for sealing the gap between the housings is integrally molded on the outer peripheral surface of the connecting member 2 where the reinforcement member 3 is placed.

Then, at step 24, the thin coaxial cable or the optical cable for connecting the housings is inserted into the connecting member 2, and finally, the cable is integrated with the housings, so that the waterproofing device for a mobile apparatus is completed.

Manufacturing Method 2

Manufacturing method 2 is different from the manufacturing method 1 in that the seal member 1 is fitted and fixed on the outer peripheral surface of the connecting member 2.

More specifically, similarly to the manufacturing method 1, the cylindrical reinforcement members 3 consisting of stainless steel are inserted into the inner peripheral surface side in the vicinities of end parts of the connecting member 2 which consists of a soft silicon resin and has a circular tube-like shape having an outer diameter of 2 mm and a thickness of 0.2 mm.

On the other hand, a single body of the seal member 1 consisting of a silicon rubber material is molded by using a metal mold.

When the seal member 1 is the frame-shaped seal 11, a through hole for inserting the connecting member 2 is provided in a vicinity of the corner part 111 of the frame-shaped seal 11.

Then, the seal members 1 and 1' are fitted and fixed in the vicinities of both ends of the connecting member 2.

Then, the thin coaxial cable or the optical cable for connecting the housings is inserted into the connecting member 2, and finally, the cable is integrated with the housings, so that the waterproofing device for a mobile apparatus is completed.

Furthermore, of course, the present invention is not limited to the above-described preferred embodiments for carrying out of the invention, and can have various kinds of configurations so as not to depart from the objective of the present invention.

What is claimed is:

1. A method of manufacturing a waterproofing device for a mobile apparatus, the method comprising:
    a step of entirely inserting cylindrical reinforcement members into an inner peripheral surface side in the vicinities of end parts of a connecting member molded in a circular tube-like shape with a soft resin material such that the connecting member extends on both sides of the reinforcement members;
    after inserting the cylindrical reinforcement members into the connecting member, a step of integrally molding seal members consisting of a rubber-like elastic material for sealing a gap between housings on an outer peripheral surface of the connecting member where the reinforcement members have been placed by using a metal mold, the reinforcement members having an axial length corresponding to a region of the connecting member which the metal mold contacts during molding of the seal members, the rubber-like elastic material being different from the soft resin material; and
    after molding the seal members to the connecting member, a step of inserting a linear member for connecting the housings to each other into the connecting member,
    the axial length of each reinforcement member is larger than a width of a part of each seal member molded to the connecting member.

2. A waterproofing device for a mobile apparatus manufactured by the manufacturing method as claimed in claim 1.

3. The method of manufacturing a waterproofing device for a mobile apparatus as claimed in claim 1,
    wherein the reinforcement members consist of a metal material.

4. The method of manufacturing a waterproofing device for a mobile apparatus as claimed in claim 1,
    wherein the seal members are frame-shaped seals.

5. The method of manufacturing a waterproofing device for a mobile apparatus as claimed in claim 4,
    wherein the connecting member is integrated in the vicinity of a corner part of the frame-shaped seals.

6. The method of manufacturing a waterproofing device for a mobile apparatus as claimed in claim 1,
    wherein the seal members are bush-shaped seals.

7. The method of manufacturing a waterproofing device for a mobile apparatus as claimed in claim 1,
    wherein the seal members are a combination of a frame-shaped seal and a bush-shaped seal.

8. A method of manufacturing a waterproofing device for a mobile apparatus, the method comprising:
    providing a tubular connecting member;
    inserting cylindrical reinforcement members entirely into ends of the connecting member such that the connecting member extends on both sides of the reinforcement members;
    using a metal mold to integrally mold seal members onto an outer peripheral surface of the connecting member at a location where the reinforcement members have been inserted, the reinforcement members having an axial length corresponding to a region of the connecting member which the metal mold contacts during molding of the seal members, the seal members being formed of a different material than the connecting member; and
    after molding the seal members to the connecting member, passing a cable entirely through the connecting member and the reinforcement members,
    wherein each reinforcement member extends beyond both sides of each seal member.

9. The method of manufacturing a waterproofing device for a mobile apparatus as claimed in claim 8,
    wherein the tubular connecting member is formed of a soft silicon resin.

10. The method of manufacturing a waterproofing device for a mobile apparatus as claimed in claim 9,
    wherein the seal members are formed of silicon rubber.

11. The method of manufacturing a waterproofing device for a mobile apparatus as claimed in claim 10,
    wherein the reinforcement members are formed of stainless steel.

12. The method of manufacturing a waterproofing device for a mobile apparatus as claimed in claim 8,
    wherein the seal members are formed of silicon rubber.

\* \* \* \* \*